(12) United States Patent
Petre et al.

(10) Patent No.: US 7,948,869 B2
(45) Date of Patent: May 24, 2011

(54) TIME-ENCODING-BASED HIGH-CAPACITY DIGITAL COMMUNICATION LINK

(75) Inventors: Peter Petre, Oak Park, CA (US); Jose Cruz-Albrecht, Oak Park, CA (US); Joseph F. Jensen, Camarillo, CA (US)

(73) Assignee: HRL Laboratories, LLC, Malibu, CA (US)

( * ) Notice: Subject to any disclaimer, the term of this patent is extended or adjusted under 35 U.S.C. 154(b) by 635 days.

(21) Appl. No.: 11/946,844

(22) Filed: Nov. 29, 2007

(65) Prior Publication Data
US 2009/0141815 A1    Jun. 4, 2009

(51) Int. Cl.
*H04J 7/00* (2006.01)
(52) U.S. Cl. ............................................. 370/212
(58) Field of Classification Search .................. 370/212, 370/464, 465, 498, 503; 375/216, 220, 238, 375/316; 341/50, 143, 144
See application file for complete search history.

(56) References Cited

U.S. PATENT DOCUMENTS

| | | | | |
|---|---|---|---|---|
| 3,925,649 A * | 12/1975 | Haeusler | ...................... | 708/652 |
| 5,748,126 A * | 5/1998 | Ma et al. | ...................... | 341/143 |
| 5,901,176 A * | 5/1999 | Lewison | ...................... | 375/238 |
| 6,064,646 A * | 5/2000 | Shal et al. | ...................... | 370/212 |
| 7,336,210 B2 * | 2/2008 | Lazar | ...................... | 341/110 |
| 7,573,956 B2 * | 8/2009 | Lazar et al. | ...................... | 375/340 |

* cited by examiner

*Primary Examiner* — Dmitry H Levitan
(74) *Attorney, Agent, or Firm* — O'Connor & Company (57) ABSTRACT

The present invention relates to a digital communication architecture based upon the concept of time encoding. In one aspect, systems provide time-encoding-based digital communication, the systems comprising a transmitter, a communication channel, and a receiver. In another aspect, methods for digital communication comprise time encoding digital input data and then transmitting the resultant asynchronous pulse signal to a receiver that converts the asynchronous pulse signal back into digital symbols. Methods of providing a digital communication link can include (i) providing digital symbols, (ii) time encoding the digital symbols to generate asynchronous pulse signals, (iii) communicating switching times of the signals to a receiver, and (iv) digitizing in parallel and reconstructing the digital symbols. The methods and systems of the invention can utilize existing chip-scale circuit technologies and can be characterized by link capacities of 50 Gbit/sec, 100 Gbit/sec, 200 Gbit/sec, or higher.

19 Claims, 6 Drawing Sheets

TIME-ENCODING-BASED HIGH-CAPACITY DIGITAL COMMUNICATION LINK

FIELD OF THE INVENTION

The present invention generally relates to communication systems. More specifically, the present invention relates to a digital communication architecture based upon the concept of time encoding.

BACKGROUND OF THE INVENTION

The continuing decrease in the minimum feature size of modern complementary metal-oxide-semiconductor processes has necessitated a reduction in the circuit supply voltage for reliability and power-dissipation reasons. This reduction is problematic for traditional analog-to-digital conversion schemes because of the reduction in the resolution available within the amplitude range. On the other hand, the decrease in the minimum feature size has a beneficial effect on the obtainable time resolution in the circuitry, owing to the increase in the intrinsic speed of the transistors. Therefore, it is of interest to turn over the amplitude axis to the time axis and to encode information in the latter rather than the former (Roza, *IEEE Transactions on Circuits and Systems—II: Analog and Digital Signal Processing*, Vol. 44, No. 11, 1997). Such a concept is now known as "time encoding."

Time encoding is a real-time, asynchronous mechanism for encoding the amplitude information of an analog band-limited signal into a time sequence, or time codes, based on which the signal can be reconstructed. Time codes can be generated by simple non-linear asynchronous analog circuits with low power consumption.

As described in Lazar and Tóth (*IEEE Transactions on Circuits and Systems—I: Regular Papers*, Vol. 51, No. 10, 2004), which is hereby incorporated by reference, time encoding of a band-limited function x(t) is a representation of x(t) as a sequence of strictly increasing times $t_k$. Alternatively, the output of an encoder can be a digital signal that switches between two values ±b at times $t_k$.

There are two natural requirements that a time-encoding mechanism has to satisfy (Lazar and Tóth, 2004). The first is that the encoding should be implemented as a real-time asynchronous circuit. Second, the encoding mechanism should be invertible, i.e., the amplitude information can be recovered from the time sequence with arbitrary accuracy.

Radio-frequency, or RF, signals are electromagnetic signals, i.e. waveforms with electrical and magnetic properties within the electromagnetic spectrum normally associated with radio wave propagation. Many communication systems modulate electromagnetic signals from baseband to higher frequencies for transmission, and subsequently demodulate those high frequencies back to their original frequency band when they reach the receiver. The original (or baseband) signal may be, for example, data, voice or video. These baseband signals may be produced by transducers such as microphones or video cameras, may be computer-generated, or may be transferred from an electronic storage device. In general, the high frequencies provide longer range and higher-capacity channels than baseband signals, and because high-frequency signals can effectively propagate through the air, they can be used for wireless transmissions as well as hard-wired or wave-guided channels.

While analog communications use a continuously varying signal, a digital transmission can be broken down into discrete messages. Transmitting data in discrete messages allows for greater signal-processing capability. The ability to process a communications signal means that errors caused by random processes can be detected and corrected. Digital signals can also be sampled instead of continuously monitored and multiple signals can be multiplexed together to form one signal. Recent advances in wideband communication channels and solid-state electronics have encouraged applications that utilize digital communications to grow quickly.

Many challenging information applications require high-capacity digital communication links. These applications include bandwidth-efficient RF communication, Low Probability of Intercept and Detection communication, and wide-bandwidth optical communication. Agility in transmission spectral efficiency, as well as spectrally agile transmission capability, is important for free-space optical links in maintaining optimum information capacity, security, network robustness, and power management performance in dynamically changing network environments.

In Lazar and Tóth, *IEEE Transactions on Circuits and Systems—I: Regular Papers*, Vol. 51, No. 10, 2004, a time-encoding circuit (limit cycle oscillator) is presented to time encode analog band-limited signals. It is shown that an analog input signal can be converted into an asynchronous pulse sequence, and that the original analog input signal can perfectly be recovered from the pulse sequence. However, this disclosure is limited to the time-encoding transformation from the analog domain to the asynchronous pulse domain and back. No attempt is made to time encode digital data and signals. Also, the authors did not attempt to apply the time-encoding circuit to analog-to-digital conversion and to a digital communications link.

In Roza, *IEEE Transactions on Circuits and Systems—II: Analog and Digital Signal Processing*, Vol. 44, No. 11, 1997, a duty cycle Analog-to-Digital Converter (ADC) architecture is studied. The conversion from the time-encoded analog input signal (asynchronous pulse sequence) to the digital representation of the input signal is done, as described therein, by a direct sampling process. This sampling process introduces large quantization errors that can only be mitigated by significantly over-sampling the individual pulses in the asynchronous pulse sequence. A high-speed and highly accurate external synchronous clock are necessary as described therein. The speed of the clocked sampling circuitry must be much higher than the input signal bandwidth, typically by several orders of magnitude. This seriously limits the achievable bandwidth of the ADC even when it is implemented by state-of-the-art circuit technology (such as is described in R. Walden, "Analog-to-Digital Converter Survey and Analysis," *IEEE Journal on Selected Areas in Communications*, Vol. 17, No. 4, 1999). Roza (1997) is further limited to applying the time-encoding concept to analog-to-digital conversion using direct serial sampling of the resultant asynchronous pulse sequence. This method requires a large oversampling ratio in the clocked sampling circuit or the use of poly-phase samplers.

In view of the state of the art, methods and systems are needed that provide digital communication links with high information capacity, such as 50, 100, or more gigabits per second. What would be especially useful is a digital communication architecture based upon the concept of time encoding of digital input data with little, if any, loss of information. Preferably, the analog-to-digital conversion would require no oversampling, thereby allowing ultrawide-bandwidth operation. Further, in order for the methods and systems to be economically practical, they should utilize existing chip-scale circuit technologies.

SUMMARY OF THE INVENTION

In one aspect of the present invention, systems provide time-encoding-based digital communication, the systems comprising (i) a transmitter, (ii) a communication channel, and (iii) a receiver.

In some embodiments of the systems, the transmitter comprises a time-encoding circuit capable of converting digital input data into an asynchronous pulse sequence. The communication channel is capable, in some embodiments, of conserving the relative time distances between consecutive switching time points in the asynchronous pulse sequence. In some embodiments, the transmitter can operate asynchronously and can generate samples at both rising and falling edges of the resultant asynchronous clock. The systems can further include on/off mode modulation to send switching time-point information of an asynchronous pulse sequence from transmitter to receiver.

In certain embodiments of the systems, the transmitter comprises a digital-input high-speed time-encoding circuit and asynchronous digital buffer circuit or circuits, wherein the time-encoding circuit is capable of time encoding digital input data to generate an asynchronous pulse sequence that has binary amplitude and arbitrary pulse widths, wherein the digital input data can be stored in a digital memory which can use said asynchronous pulse sequence as a clock to read out the next digital words from the memory, and wherein the switching time points in the asynchronous pulse sequence can be transmitted to the receiver unit via the communication channel. Preferably, the time-encoding circuit does not include an analog amplifier or an analog adder.

In certain embodiments of the systems, the receiver comprises:
(i) a demodulator circuit capable of demodulating a modulated asynchronous pulse sequence back into its original form;
(ii) a pulse domain asynchronous de-multiplexer circuit capable of de-multiplexing the asynchronous pulse sequence into individual channels;
(iii) a plurality of 1-bit Digital-to-Analog Converters capable of regenerating the pulse sequences with substantially precise amplitudes;
(iv) a plurality of integrator circuits capable of integrating the pulse sequences in (iii) and generating a constant-voltage signal;
(v) a plurality of n-bit Analog-to-Digital Converters capable of digitizing said constant-voltage signal; and
(vi) a Digital Signal Processor unit capable of recovering the original digital data.

The systems of the invention can be characterized by link capacities of about 50 Gbit/sec, 100 Gbit/sec, 200 Gbit/sec, or higher.

In another aspect of the present invention, methods for digital communication comprise time encoding digital input data and then transmitting the resultant asynchronous pulse signal to a receiver that converts the asynchronous pulse signal back into digital symbols.

In some embodiments, the methods include time-interleaved time encoding-based analog-to-digital conversion. In some embodiments, the methods utilize real-time digital-symbol reconstruction based upon simple division of two digital numbers. In preferred embodiments, during transmitting, samples are generated at both the rising and falling edges of an asynchronous clock that characterizes the analog signal. These methods can provide bit rates of digital communication of at least 50 Gbit/sec, 100 Gbit/sec, or higher.

In yet another aspect of the present invention, methods of providing a digital communication link comprise (i) providing digital symbols, (ii) time encoding the digital symbols to generate asynchronous pulse signals, (iii) communicating switching times of the signals to a receiver, and (iv) digitizing in parallel and reconstructing the digital symbols. In these methods, the communication link is characterized by an average capacity of at least 50 Gbit/sec, 100 Gbit/sec, 200 Gbit/sec, 500 Gbit/sec, or even higher.

DETAILED DESCRIPTION OF EMBODIMENTS OF THE INVENTION

The apparatus and methods of the present invention will now be described in detail by reference to various non-limiting embodiments of the invention.

Unless otherwise indicated, all numbers expressing dimensions, frequencies, efficiencies, and so forth used in the specification and claims are to be understood as being modified in all instances by the term "about." Without limiting the application of the doctrine of equivalents to the scope of the claims, each numerical parameter should at least be construed in light of the number of reported significant digits and by applying ordinary rounding techniques.

The basic principle of operation of a time encoder is as follows, which is a generalized description of time encoders used in some embodiments of the invention. The bounded input signal $x(t)$, $|x(t)| \leq c < b$, is biased by a constant amount before being applied to the integrator. This bias guarantees that the integrator's output is a positive (or negative) increasing (or decreasing) function of time. In steady state, there are two possible operating modes. In the first mode, the output of the time encoder is in state $z(t) = -b$ and the input to a comparator circuit grows from to $-\delta$ to $\delta$. When the output of the integrator reaches the maximum value $\delta$, a transition of the output $z(t)$ from $-b$ to $+b$ is triggered and the feedback becomes negative.

In the second mode of operation, the time encoder is in state $z(t) = b$ and the integrator output steadily decreases from $\delta$ to $-\delta$. When the maximum negative value $-\delta$ is reached $z(t)$ will reverse to $-b$. Thus, while the transition times of the output are non-uniformly spaced, the amplitude of the output signal remains constant. Therefore, a transition of the output from $-b$ to $b$ or vice-versa takes place every time the integrator output reaches the triggering mark $\delta$ or $-\delta$ (called quanta). The time when this quanta is achieved depends on the signal as well as on design parameters. Hence, the time encoder maps amplitude information into timing information. It achieves this by a signal-dependent sampling mechanism.

Figure 1:
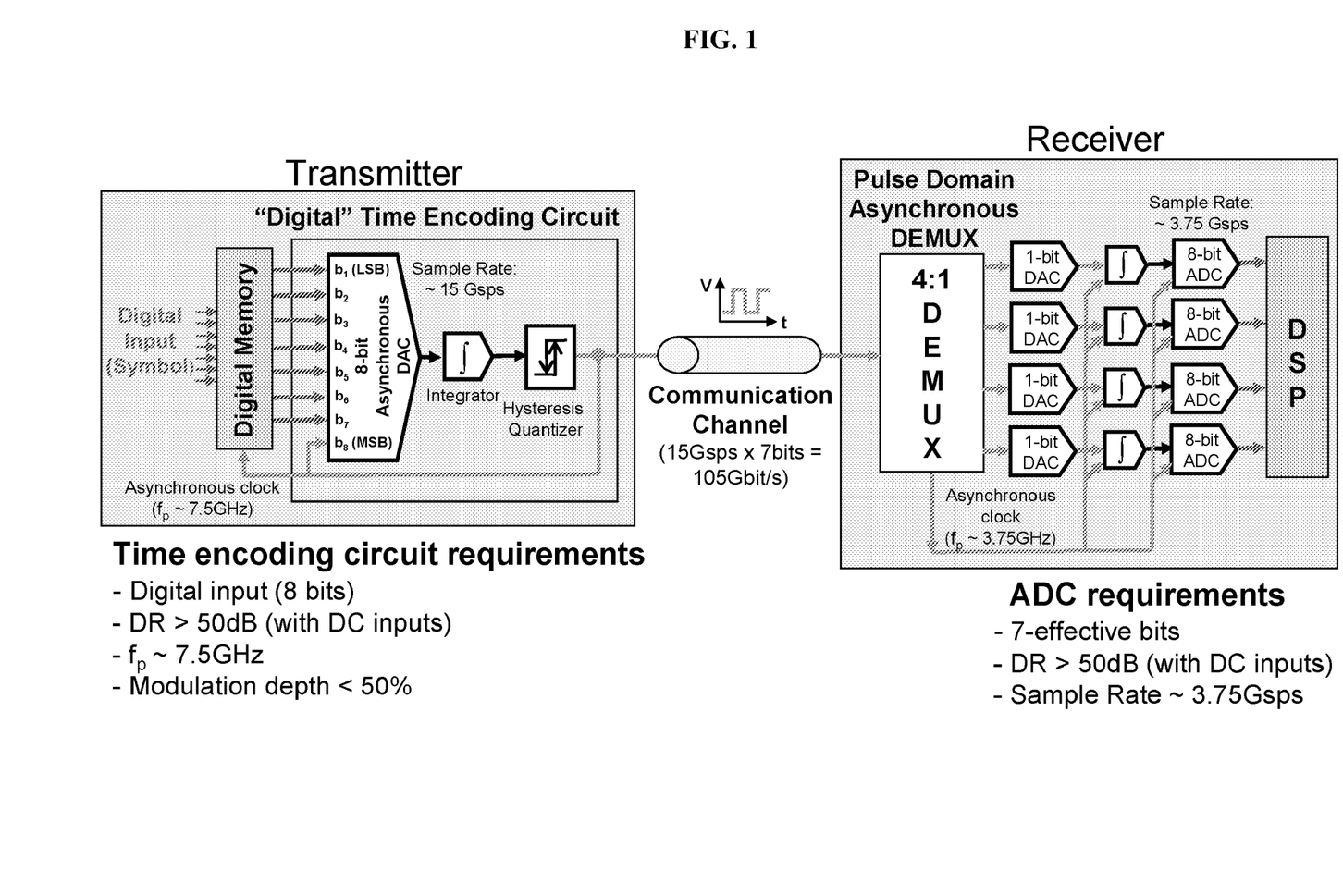
FIG. 1 is a depiction of the time-encoding-based high-capacity digital-communication link, according to some embodiments of the present invention.

FIG. 1 shows the general architecture of preferred, but non-limiting, system and method embodiments of the invention. This system architecture is based upon the concept of time encoding digital input data (symbols) and then transmitting the resultant asynchronous (analog) pulse signal via a bandwidth-efficient communication channel to a receiver that converts the asynchronous pulse sequence back into digital symbols in real time. The system architecture has three primary parts: (1) at least one transmitter, (2) at least one communication channel, and (3) at least one receiver.

In these embodiments, the transmitter side of the communication link consists of a digital input high-speed time-encoding circuit and asynchronous digital buffer (memory) circuitries. The time-encoding circuit time encodes the digital input data, which are 7-bit digital words in the embodiments shown in FIG. 1, generating an asynchronous pulse sequence that has binary amplitude and arbitrary pulse widths. The input digital data are stored in a digital memory which uses the asynchronous pulse sequence as a clock to read out the next digital words from the memory. The first part of the time-encoding circuit is an 8-bit asynchronous DAC. This circuit can generate a constant-current output based on the value of the digital symbol. This current is fed into an integrator circuit which can integrate the current and provide a linearly increasing or decreasing voltage value at its output. When the output voltage reaches a prescribed value, the hysteresis quantizer circuit can switch its state and generate a new pulse at its output which is also fed back to the input DAC. By this process an asynchronous pulse sequence is generated which represents the input digital symbols.

In these embodiments, the switching time points in the asynchronous pulse sequence are transmitted to the receiver unit via a communication channel. The communication channel can be designed in many ways as is known in the art. In preferred embodiments, the communication channel conserves, or substantially conserves, the relative time distances between consecutive switching time points in the asynchronous pulse sequence with a given accuracy dictated by the channel capacity. The channel capacity can be, for example, 105 Gbit/sec (15 Gsps×7 bits), or some other capacity.

In these embodiments, the receiver side of the communication link consists of a demodulator circuit, a pulse domain asynchronous de-multiplexer (DEMUX) circuit, four 1-bit Digital-to-Analog Converters (DACs), four integrator circuits, four 8-bit Analog-to-Digital Converters (ADCs), and a Digital Signal Processor (DSP) unit. The demodulator circuit demodulates the modulated asynchronous pulse sequence back into its original form. The resultant asynchronous pulse sequence is de-multiplexed into individual channels by the pulse domain DEMUX. In each channel the 1-bit DAC regenerates the pulses with high-precision amplitudes which are then integrated by the integrator circuit. The integrator output is a constant-voltage signal which is digitized by the 8-bit ADC. The 8-bit digital data is sent to the DSP which recovers the original digital data (symbols) via simple digital computation.

The high data rate in some preferred embodiments of the methods and systems of the invention results, in part, from the fact that the time-encoding circuit operates asynchronously and it generates samples at both the rising and falling edges of the resultant asynchronous clock.

Certain preferred embodiments are capable of attaining data communication rates of about 100 Gbit/sec. In some embodiments that can achieve 100 Gbit/sec bit rate, the time-encoding circuit has greater than 50 dB dynamic range at a ~7.5 GHz pulse rate. In these embodiments, the DAC (described in more detail below) should have at least 8-bit resolution at 7.5 GHz clock rate. A person having ordinary skill in the art will appreciate that this dynamic range is readily achievable with commercially available complementary metal-oxide-semiconductor (CMOS) technology.

Figure 2:
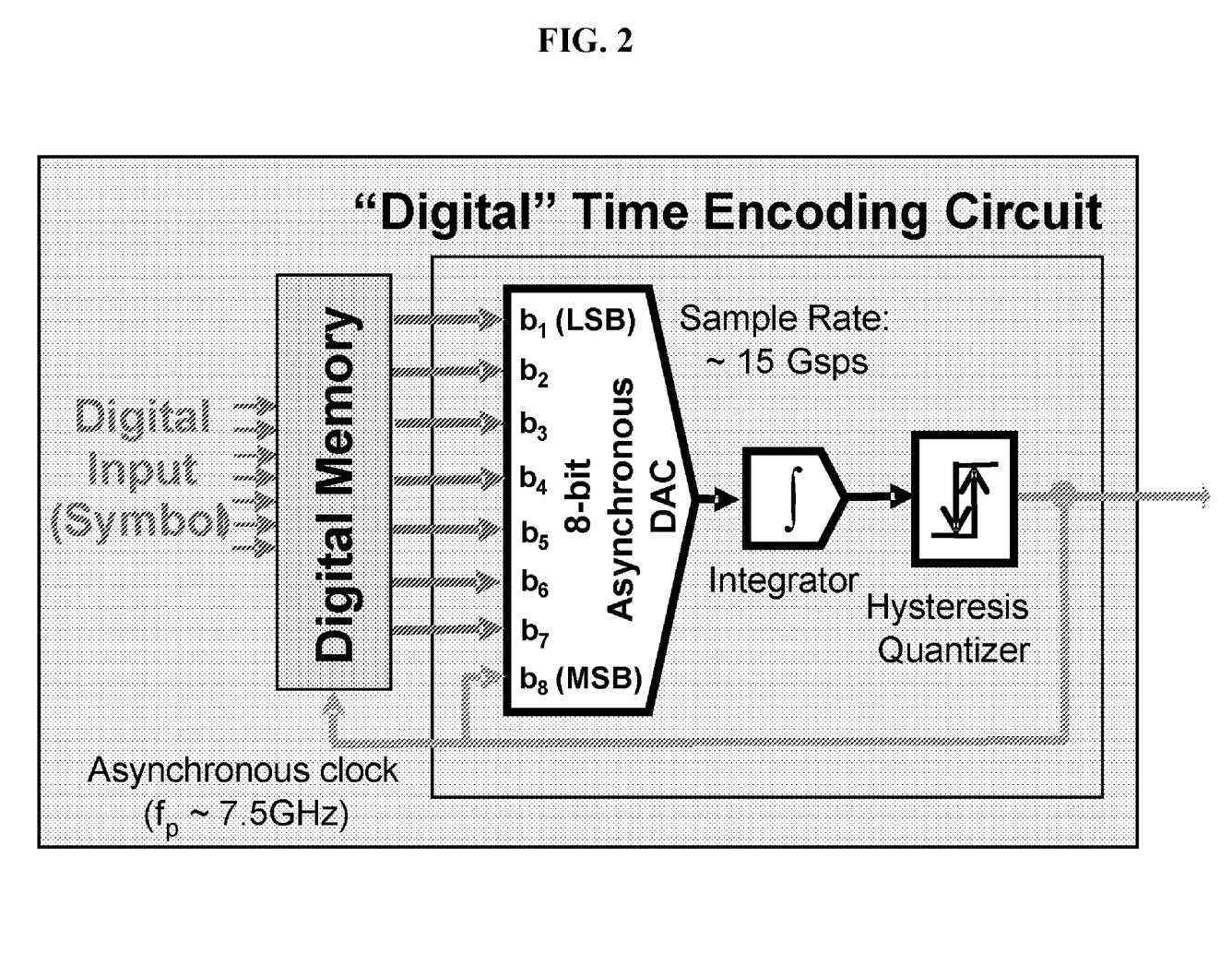
FIG. 2 is an illustration of a digital-input time encoder according to some embodiments of the invention.

FIG. 2 shows a diagram of the digital-input time encoder of certain system and method embodiments of the invention. It is composed of an asynchronous Digital to Analog (DAC) input element, an integrator, and a hysteresis quantizer. A feedback connection is made from the output of the hysteresis quantizer to the most significant bit input of the DAC. The input digital word is supplied to the less significant inputs of the DAC. The circuit characterized in FIG. 2 does not require an analog amplifier or analog adder. High linearity can therefore be achieved, as analog amplifiers and adders are major known contributions to distortion.

Figure 3:
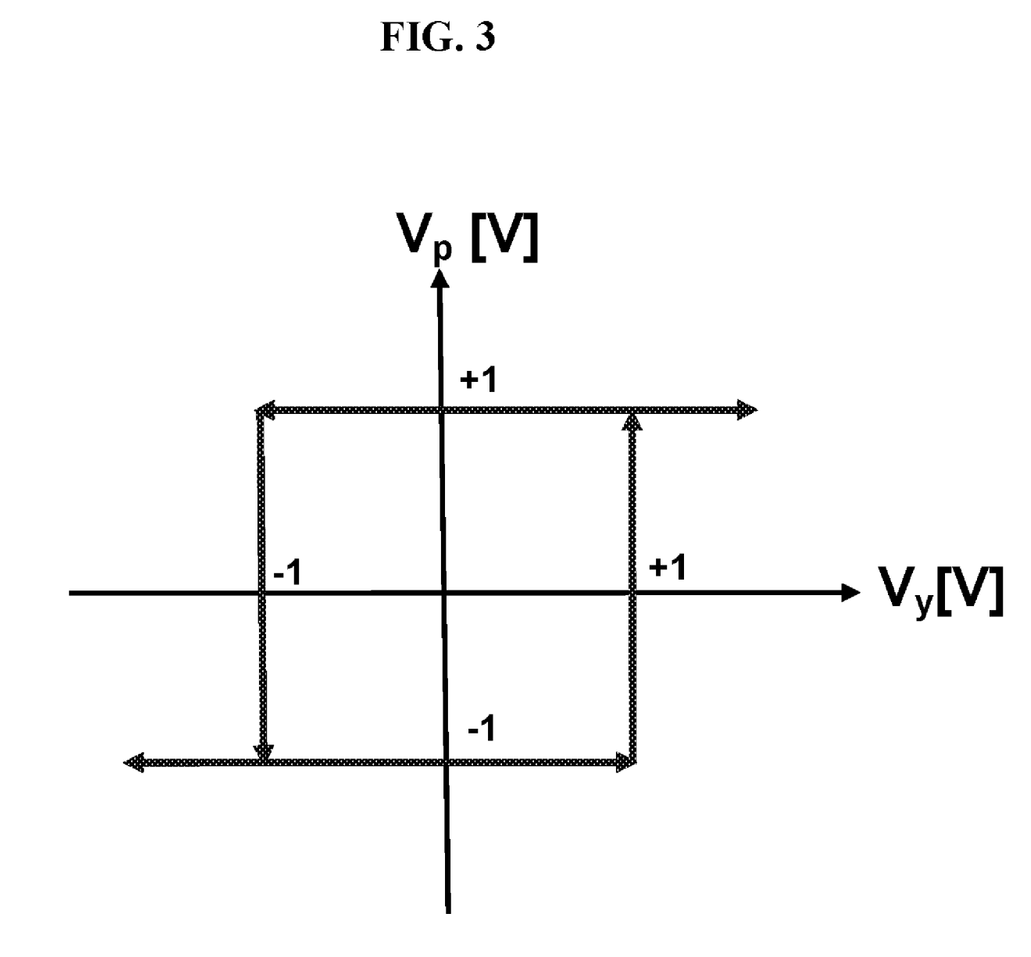
FIG. 3 shows the output-input characteristic of a hysteresis quantizer.

FIG. 3 shows the output-input characteristic of the hysteresis quantizer used in these embodiments. There are only two possible output levels: −1 and +1. They are shown in the vertical axis of the graph. The transition between the two output levels occurs at two different input trigger voltage levels. In this example, these trigger voltage levels are normalized to −1V and +1V. They are shown in the horizontal axis of the graph. All these values can be scaled, as best suited for a particular large-scale-integration or VLSI implementation, without changing the basic operation of the circuit.

Figure 4:
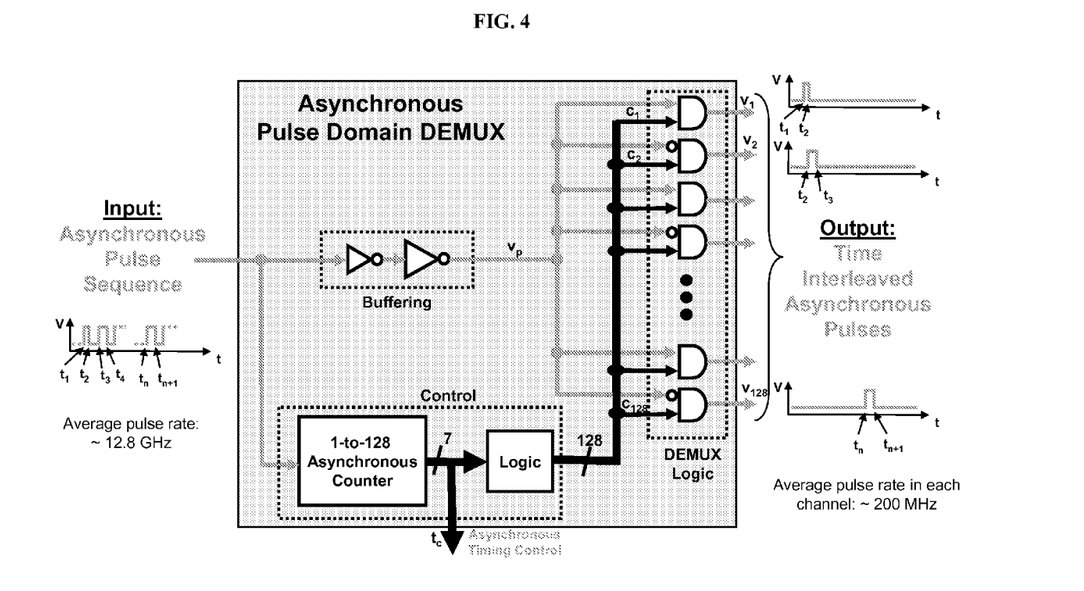
FIG. 4 is a diagram of a pulse domain DEMUX according to some embodiments of the invention.

FIG. 4 shows a diagram of a general pulse domain demultiplexer (also referred to as "DEMUX" herein). This is the first circuit component after the demodulator circuit in the receiver unit. In this example, it is a 1:4 DEMUX and is used to parallelize the pulse data prior to digitization. In preferred embodiments, the DEMUX enables a significant reduction in data rate before digitization in each channel; and it allows higher-bandwidth operation of the entire ADC/receiver system.

The DEMUX circuit is preferably composed of two paths. One is the path used for the data. The other path is used for the control. Both paths are driven by the input pulse signal. The data is fed, after optionally being buffered, into an array of DAC gates. The control can be, for example, a 1-to-4 counter with no clock. It increments its asynchronous 7-bit output word when a pulse transition is detected at the input. The increment occurs for both positive and negative pulse transitions. After reaching maximum value 4 the next value is reset to 1. The 7-bit word is denoted in FIG. 4 as "Asynchronous Timing Control," $t_c$. This control is used to drive a logic circuit that produces 4 control signals. The circuit can be insensitive (up to a given threshold) to jitter and offsets in the timing of $t_c$ and the 4 control signals.

Figure 5:
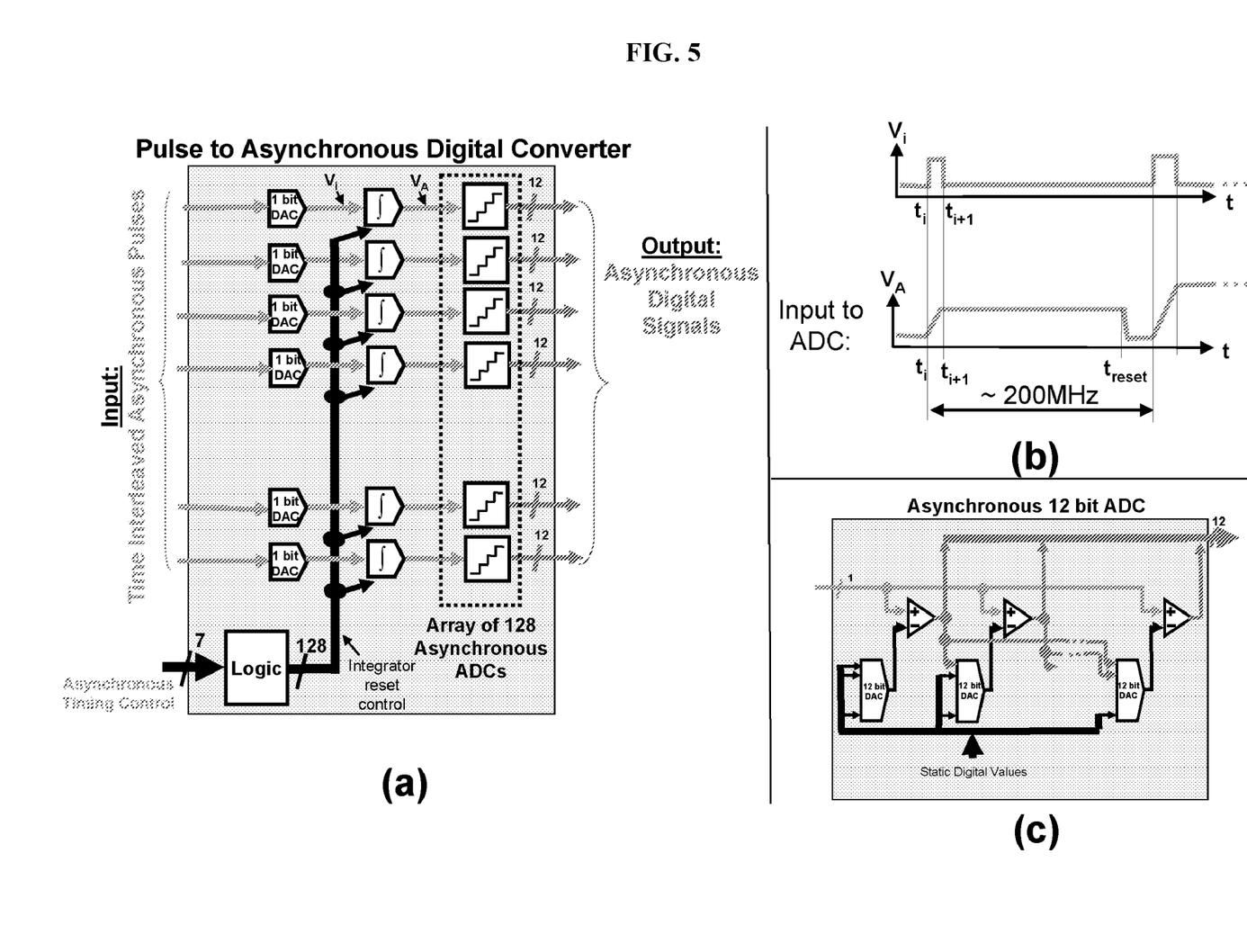
FIG. 5 is an illustration of a pulse to asynchronous digital converter according to some embodiments of the invention.

FIG. 5 shows a diagram of a Pulse to Asynchronous Digital Converter that can be provided in certain embodiments. FIG. 5($a$) shows a diagram of the entire Pulse to Asynchronous Digital Converter circuit. The circuit is fully asynchronous. It does not require any external clock. The function is to convert time-interleaved asynchronous pulses into digital asynchronous signals. The circuit has a 4-input data channel and a 7-bit asynchronous timing control input, $t_c$. The data and the control are produced by the DEMUX block of FIG. 4. This block produces a parallel data output of 4 channels. Each output channel produces an asynchronous 8-bit digital word. Each of the 4 channels is composed of a 1-bit DAC, an integrator with a reset control input, and an asynchronous ADC. The control circuit is composed of a 7-input 128-output static logic circuit. In this block, DAC regenerates any amplitude-level attenuation in the input signals. Therefore, the circuit can be tolerant to changes in the amplitude value from the interconnect signals from the earlier block, wherein only the timing of the pulses is relevant.

For each time-interleaved asynchronous pulse, in certain embodiments, only the time duration of the pulse is relevant and not the exact timing of the rise and fall edges. The integral value of the pulse is computed for each channel. The circuit can be tolerant to constant timing offsets (time skews) in the incoming interleaved pulse data. Furthermore, the circuit can tolerate—without information loss—different time offsets for each channel.

FIG. 5(b) shows exemplary waveforms at channel i. The top waveform is the pulse data. In this illustration, a pulse arrives on average every 5 ns (equivalent to a rate of 200 MHz). The duration of a single pulse, or counter value time interval, is much shorter. On average, the duration of a pulse is just 5×1/128 ns with a relatively long interval of 5×127/128 ns with no pulse. The bottom waveform shows the output of the integrator. This output is reset about 2 counter intervals before the pulse arrival. The pulse is integrated and the value is held at the integrator output until the next reset. During most of the 5 ns interval, the integrator output is a constant value that corresponds to the integral of the pulse. In each channel, the asynchronous ADC has most of the 5 ns available to settle. Furthermore, the data to be digitized is a constant value.

In preferred embodiments, the speed requirements on each individual asynchronous ADC can be modest compared to the specifications of the system. For example, the individual asynchronous ADC can have a 200 MHz settling rate for digitizing a constant input, in an embodiment wherein the receiver system can digitize a varying signal with a 7.5 GHz bandwidth. This practical feature allows methods and systems of the invention to preferably achieve high data rates by implementing a plurality of moderate-performance asynchronous ADCs that produce 8-bit words. FIG. 5(c) shows an example of a possible implementation of such an ADC, which is found in Dighe, "An Asynchronous Serial Flash Converter" *9th Int. Conf on Electronics, Circuits and Systems,* 2002. As will be recognized, other commercially available ADCs could be utilized.

Figure 6:
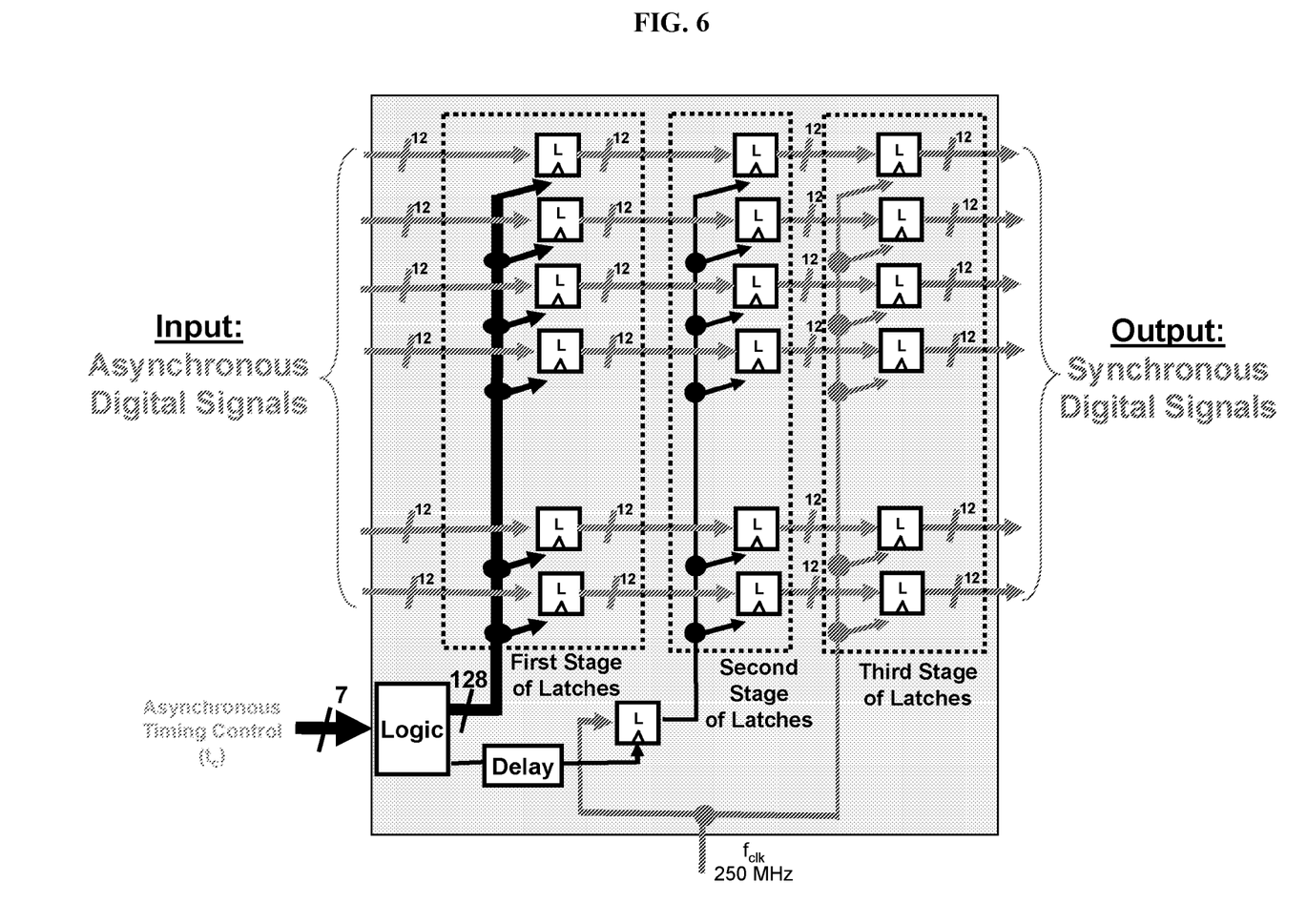
FIG. 6 is a sketch of an asynchronous digital to synchronous digital converter according to some embodiments of the invention.

FIG. 6 shows the diagram of an Asynchronous Digital to Synchronous Digital Converter according to some embodiments. This circuit block requires a clock. The block receives four 8-bit asynchronous words as data. It also receives a control input, $t_c$, from the counter of the DEMUX block, and an external clock reference $f_{clk}$. It produces four 8-bit words synchronized to the clock as output data. The circuit has four channels stages. Each channel is composed of three latches. The first latch stage of each channel captures the digital asynchronous data when an internal control signal has a rising edge. There are four of these control signals, one for each channel. The control signal for the first latch of each channel is generated by the logic block using the asynchronous timing control, $t_c$. For each channel, the control signal rises when the preceding asynchronous ADC in the previous block (the Pulse to Asynchronous Digital Converter) has used most of the period allocated for settling, at the end of the holding period and just before the reset signal of that particular channel is enabled.

In this detailed description, reference has been made to multiple embodiments and to the accompanying drawings in which is shown by way of illustration specific exemplary embodiments in which the invention may be practiced. These embodiments are described in sufficient detail to enable those skilled in the art to practice the invention, and it is to be understood that modifications to the various disclosed embodiments may be made by a skilled artisan. Other embodiments that do not provide all of the features and advantages set forth herein may be utilized, without departing from the spirit and scope of the present invention. Such modifications and variations are considered to be within the scope of the invention defined by the appended claims.

The invention claimed is:

1. A system for providing time-encoding-based communication of digital input data, said system comprising:
   (i) a transmitter comprising a time-encoding circuit capable of converting said digital input data into an asynchronous pulse sequence;
   (ii) a communication channel; and
   (iii) a receiver,
   wherein said transmitter further comprises an asynchronous digital memory to store said digital input data, and wherein said asynchronous pulse sequence is used as a clock to read out digital words from said digital memory.

2. The system of claim 1, wherein said communication channel is capable of conserving the relative time distances between consecutive switching time points in said asynchronous pulse sequence.

3. The system of claim 1, wherein said transmitter further comprises a hysteresis quantizer to send switching time-point information of an asynchronous pulse sequence from said transmitter to said receiver.

4. The system of claim 1, wherein said transmitter can operate asynchronously and can generate samples at both rising and falling edges of an asynchronous clock that characterizes said asynchronous pulse sequence.

5. The system of claim 1 which has a link capacity of about 100 Gbit/sec or more.

6. The system of claim 1, wherein said transmitter comprises a digital-input high-speed time-encoding circuit capable of time encoding digital input data to generate an asynchronous pulse sequence that has binary amplitude and arbitrary pulse widths, and wherein the switching time points in said asynchronous pulse sequence can be transmitted to said receiver unit via said communication channel.

7. The system of claim 6, wherein said time-encoding circuit does not include an analog amplifier or an analog adder.

8. The system of claim 1, wherein said receiver comprises:
   (i) a demodulator circuit capable of demodulating a modulated asynchronous pulse sequence back into its original form;
   (ii) a pulse domain asynchronous de-multiplexer circuit capable of de-multiplexing the asynchronous pulse sequence into individual channels;
   (iii) a plurality of 1-bit Digital-to-Analog Converters capable of regenerating said pulse sequences with substantially precise amplitudes;
   (iv) a plurality of integrator circuits capable of integrating said pulse sequences in (iii) and generating a constant-voltage signal;
   (v) a plurality of n-bit Analog-to-Digital Converters capable of digitizing said constant-voltage signal; and
   (vi) a Digital Signal Processor unit capable of recovering the original digital data.

9. A method of communication of digital input data, said method comprising time encoding said digital input data and then transmitting the resultant asynchronous pulse signal to a receiver that converts said asynchronous pulse signal back into digital symbols, wherein said transmitting comprises storing said digital input data in an asynchronous digital memory, and wherein said asynchronous pulse signal is used as a clock to read out digital words from said digital memory.

10. The method of claim 9, comprising time-interleaved time encoding-based analog-to-digital conversion.

11. The method of claim 9, wherein during said transmitting, samples of said digital input data are generated at both the rising and falling edges of an asynchronous clock that characterizes said asynchronous pulse sequence.

12. The method of claim 9, wherein the bit rate of said digital communication is at least 50 Gbit/sec.

13. The method of claim 12, wherein said bit rate is at least 100 Gbit/sec.

14. A method of providing a communication link for digital symbols, said method comprising:
   (i) providing digital symbols and storing said digital symbols in an asynchronous digital memory;
   (ii) time encoding said digital symbols to generate asynchronous pulse signals used as a clock to read out digital words from said digital memory;
   (iii) communicating switching times of said signals to a receiver; and
   (iv) digitizing in parallel and reconstructing said digital symbols.

15. The method of claim 14, wherein said digital communication link is characterized by an average capacity of at least 50 Gbit/sec.

16. The method of claim 14, wherein said digital communication link is characterized by an average capacity of at least 100 Gbit/sec.

17. The method of claim 14, wherein said digital communication link is characterized by a maximum capacity of at least 200 Gbit/sec.

18. The method of claim 14, wherein said digital communication link is characterized by a maximum capacity of at least 500 Gbit/sec.

19. A system for providing time-encoding-based communication of digital input data, said system comprising a transmitter with a time-encoding circuit capable of converting digital input data into an asynchronous pulse sequence, wherein said transmitter further comprises an asynchronous digital memory to store said digital input data, and wherein said asynchronous pulse sequence is used as a clock to read out digital words from said digital memory.

* * * * *